Oct. 12, 1965
R. N. LEVINN
3,211,863
THERMOSTAT WITH MOUNTING AND ELECTRICAL
CONNECTION MEANS TO SEPARATE HEATER
Filed Sept. 18, 1963
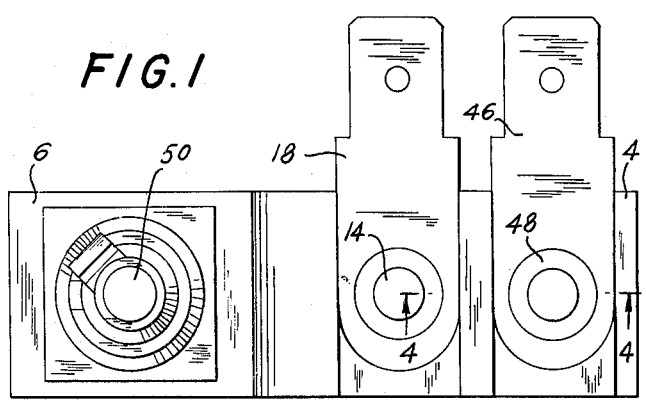
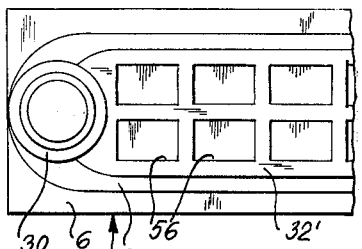
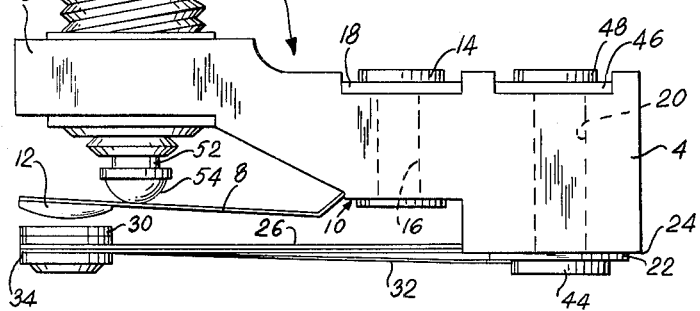
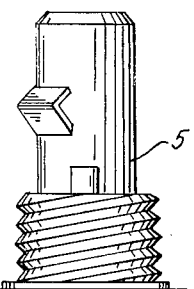
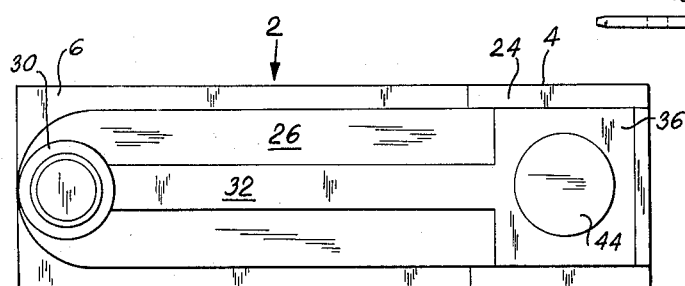
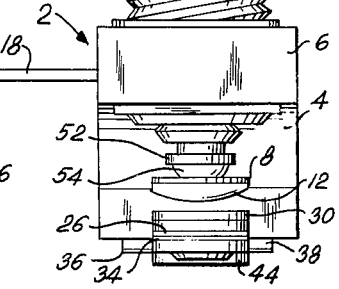
INVENTOR.
ROBERT N. LEVINN
BY 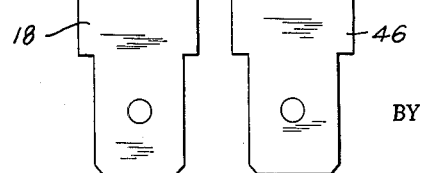
ATTORNEYS

United States Patent Office 3,211,863
Patented Oct. 12, 1965

3,211,863
THERMOSTAT WITH MOUNTING AND ELECTRICAL CONNECTION MEANS TO SEPARATE HEATER
Robert N. Levinn, Catskill, N.Y., assignor to American Thermostat Corporation, South Cairo, N.Y., a corporation of New York
Filed Sept. 18, 1963, Ser. No. 309,760
4 Claims. (Cl. 200—122)

The present invention relates to a thermostat provided with an electrically energized heating element separate from, and active on, the temperature-sensitive member.

Thermostatic or temperature-sensitive switches are used in a wide variety of applications, such as in various types of household appliances. These devices, in general, comprise a temperature-sensitive member which distorts in accordance with the temperature sensed thereby, and in thus distorting moves a contact into and out of electrical connection with a cooperating contact, thereby closing or opening an electrical circuit in which those contacts are connected. In some instances the temperature-sensitive member is directly affected and controlled by hte temperature to be regulated, but in many other instances the temperature-sensitive member is located more or less remotely from the control device. It is with this latter type of application that the present invention is primarily concerned.

Where the temperature-sensitive member is located in a position such that it cannot be completely controlled by the temperature of the device being energized, means are generally provided for supplying heat to the temperature-sensitive member in accordance with the current passing through the circuit being controlled. This can be done by having the current pass through the temperature-sensitive member itself, or a separate heater can be provided. The first alternative—causing current to pass through the temperature-sensitive member and thereby generate heat—is extremely inefficient. The nature of the materials which are employed in the bimetal strips which typically constitute the temperature-sensitive member is such that electrical resistivity is low, so that only a small amount of heat is produced per unit of current passing through that member. As a result the sensitivity of such thermostats is limited, the range of cycling rates over which such thermostats can be designed to operate is restricted, and such thermostats can function only over a narrow range of ambient temperature conditions.

The use of a separate heater for the temperature-sensitive element avoids most of the above problems. However, such separate heater arrangements as have been proposed in the past leave much to be desired in the way of cost and efficiency of operation. In some instances heaters have been confined to the support for the thermostat, but such heaters affect only a small portion of the length of the temperature-sensitive member to any appreciable degree, thus requiring excessively high temperatures and resulting in lack of sensitivity. Heaters located more or less contiguously with the temperature-sensitive member suffer from one or more of the following drawbacks: lack of efficient thermal connection, thermal connection only over a portion of the length of the temperature-sensitive member, physical interference with substantially free movement of the temperature-sensitive member, excessive expense, cumbersome structure, and lack of reliability of electrical connection and mechanical mounting.

The construction of the present invention has as its primary object the elimination, in a thermostat having a heater element separate from the temperature-sensitive member, of all of the above mentioned disadvantages. In particular, it is the prime object of the present invention to devise a thermostat assembly with a separate heater in which the temperature-sensitive member itself does not carry current, in which the operative thermal connection between the heater and the temperature-sensitive member is extremely close and efficient, in which the presence of the heater does not significantly affect the freedom of movement of the temperature-sensitive member, in which cost of manufacture and assembly is minimized, and in which reliability and flexibility of design are maximized.

To these ends the contact-carrying temperature-sensitive member is mounted on an insulating support in such a way as to be electrically disconnected from the control circuit except for the contact which is carried thereby. A heater in the form of a flexible strip of high resistance material is mounted in close juxtaposition to substantially the entire length of the temperature-sensitive member. One end of the heater may be connected directly to the contact carried by the temperature-sensitive member and the other end thereof may be electrically connected to terminal means on the insulating support. Since the heater extends along substantially the full active length of the temperature-sensitive member and is very closely positioned relative thereto, the heat produced in the heater by the passage of current therethrough will be transmitted to the temperature-sensitive member in a very efficient manner, thereby to cause it to react most sensitively. Moreover, substantially the full active length of the temperature-sensitive member will be effective to cause movement of the contact carried thereby in response to the sensed temperature changes. The flexibility of the heater offers no appreciable impediment to free bending of the temperature-sensitive member, and the close thermal connection between the two is effective in all positions of the temperature-sensitive member.

To the accomplishment of the above, and to such other objects as may hereinafter appear, the present invention relates to the construction of a thermostat, as defined in the appended claims and as described in this specification, in which:

FIG. 1 is a top plan view of a typical embodiment of the present invention;

FIG. 2 is a side elevational view thereof;

FIG. 3 is a bottom plan view thereof;

FIG. 4 is a fragmentary cross sectional view taken along the line 4—4 of FIG. 1;

FIG. 5 is an end elevational view of the thermostat, taken from the left hand end of FIG. 2; and FIG. 6 is a fragmentary bottom plan view showing an alternative embodiment.

The thermostat, in the form here specifically disclosed, comprises an insulating support generally designated 2 having a mounting portion 4 from the upper portion of which an arm 6 extends out. A spring arm 8 is mounted at 10 on the support portion 4 and extends out therefrom in cantilever fashion, a contact 12 being carried thereby adjacent its free end. The other end of the arm 8 is connected, in any appropriate manner, as by conductive rivet 14 passing through an aperture 16 in the mounting portion 4, to a terminal strip 18 mounted on and extending from the upper surface of the mounting portion 4. The spring arm 8, as is conventional, is formed of electrically conductive material.

The right hand end of the mounting portion 4 is provided with a through aperture 20 and with a projecting portion 22 at its lower surface 24. A temperature-sensitive member in the form of a bimetallic strip 26 of conventional construction is mounted on the mounting portion 4, that strip having an aperture 28 at its right hand end into which the projection 22 is received, the bimetal strip 26 extending out from the mounting portion 4 in cantilever fashion beneath the spring arm 8 and carrying at its free end a contact 30 disposed opposite, and adapted to make electrical connection with, the contact 12 carried by the spring arm 8.

The separate heater 32, in the form of an elongated flexible strip of appropriate material of high resistance, such as that sold commercially under the trade name "Nichrome," has its left hand end 34 electrically connected to the contact 30 in any appropriate manner, as by being clamped thereto. The right hand end 36 of the heater strip 32 is separated from the right hand end of the bimetal strip 26 by means of insulating washer 38, and is provided with an opening 40 through which the shank 42 of a conductive rivet or the like is adapted to pass, the enlarged head 44 of the rivet 42 clamping the right hand end 36 of the heater strip 32, the insulating washer 38, and the right hand end of the bimetallic strip 26 against the lower surface of the mounting portion 4 of the support 2. The upper end of the rivet 42 extends through a terminal strip 46 mounted on the upper surface of the mounting portion 4 and is there headed over, at 48, in order to hold all of the parts operatively connected thereto in position.

The extending portion of the arm 6 carries an adjusting screw 50 the lower end 52 of which preferably carries an insulating tip 54 which engages the spring arm 8, the latter being resiliently biased upwardly into engagement therewith.

The electrical circuit through the thermostatic switch, when the contacts 12 and 30 are in engagement, can be traced as follows: from terminal strip 18 through conductive rivet 14 and arm 8 to contact 12, thence to contact 30 and then through heater strip 32 and conductive rivet 42 to the terminal strip 46. Since the right hand end of the bimetallic strip 26 which defines the temperature-sensitive member of the thermostat is electrically insulated from the right hand end of the heater strip 32 and the conductive rivet 42 by means of the insulating washer 38 and the projection 22 which forms a part of the mounting portion 4 of the insulating support 2, no current will flow therethrough.

A typical manner of use of the thermostat of the present invention is as follows: When the device controlled by the thermostat is to be energized, the adjusting screw 50 is turned to bend the arm 8 down and bring the contact 12 into engagement with the contact 30. The screw 50 is moved past this contact-engaging position to a degree determined by the desired cycling rate of the thermostatic switch. Engagement of the contacts 12 and 30 closes the electric circuit and current flows through the resistive heater strip 32, producing heat. Because the strip 32 is positioned very close to the bimetallic strip 26, and because it extends along substantially the complete active length thereof, the heat generated in the strip 32 is efficiently and effectively transferred to the bimetallic strip 26 along substantially its entire length, thereby raising the temperature of the strip 26 and causing the strip 26 to bend downwardly as viewed in FIG. 2. The strip 26 will continue to bend downwardly until the contact 30 carried thereby has moved away from the contact 12 carried by the spring arm 8, the position of the latter being determined, as indicated above, by the setting of the adjusting screw 50. With separation of the contacts 12 and 30 current flow through the heater strip 32 ceases, the generation of heat thereby correspondingly ceases, the bimetallic strip 26 cools and bends upwardly, the contact 30 is again brought into engagement with the contact 12, closing the electrical circuit, and the cycle repeats. The duration of each cycle will be controlled by the setting of the adjusting screw 50.

The nature of the heater strip 32 is such that the amount of heat produced can readily be controlled in the design of a particular thermostat model, thereby permitting a single basic thermostat construction to be used in a variety of different applications merely by modifying the specific design of the strip 32. As shown particularly in FIG. 3 the strip 32 is considerably narrower than the bimetallic strip 26, the narrowness of the heater strip 32 determining its resistance and hence determining the amount of heat produced for a given flow of current therethrough. The heat productivity of the strip 32 can be varied, from one specific design to another, by varying the effective width of the strip 32. Similarly, as will be understood, variation in the heat producing properties of the strip 32 can be varied by selecting for that strip materials having different resistivities, or by using strips 32 of different thicknesses, although excessive increase in thickness may have the drawback of decreasing flexibility and thereby inhibiting free bending of the bimetallic strip 26.

FIG. 6 illustrates another manner in which the effective resistance of the heater strip 32, and hence its heat-producing properties, may be varied. In that embodiment the strip 32' is disclosed as having a width approximately the same as that of the bimetallic strip 26, this having the advantage of heating the bimetallic strip 26 not only along substantially its entire length but also providing substantially even heating over substantially its entire width as well. The resistance of the strip 32' is controlled by forming a plurality of apertures 56 therein, the number, size and location of these apertures 56 being chosen so as to produce strips 32' having a desired resistance. The embodiment of FIG. 6, because of the fact that a greater area of the bimetallic strip 26 is heated, results in a thermostat which reacts more quickly, all other things being equal, than the embodiment of FIG. 3.

Because of the very close operative thermal connection between the heater 32 and the temperature-sensitive member 26, it is possible to produce a thermostat of desired sensitivity and degree of control in which the heater strip 32 operates at a relatively low temperature, thereby increasing the life and reliability of the unit. The close thermal interconnection between the heater 36 and the temperature-sensitive member 26 also makes the thermostats of the present invention considerably less sensitive to ambient temperature conditions, and more capable of functioning effectively under high ambient temperatures, than has heretofore been the case.

While but a limited number of embodiments of the present invention have been disclosed, it will be apparent that many variations may be made in the specific details, all within the scope of the present invention as defined in the following claims.

I claim:

1. A thermostat assembly comprising an insulating support having a one-piece mounting portion with an arm extending out longitudinally therefrom, a first member mounted on said mounting portion at a first point, extending under said arm and carrying a first electrical contact, a temperature-sensitive member mounted on said mounting portion at a second point longitudinally spaced from said first point, extending out therefrom beneath and vertically spaced from said first member and carrying a second contact positioned opposite said first contact, said temperature-sensitive member being distortable so as to cause said second contact to move toward and away from said first contact in accordance with the temperature changes sensed by said temperature-senstive member, a current-carrying flexible resistance element mounted on said mounting portion substantially at said second point and extending out therefrom in registration with and located in close juxtaposition to said temperature-sensitive member so as to be in substantial thermal transfer relation thereto, electrical terminal means mounted on said support at a third point spaced from said second point, a conductive member passing through said support between said second and third points and electrically connected at one end to said terminal means, said resistance element being electrically connected at one end to said second contact and at its other end to said conductive member, and means electrically insulating said temperature-sensitive member from said conductive member, whereby said temperature-sensitive member, substantially except for said second contact carried thereby, is out of electrical circuit to said second contact but is sensitive to the heat developed in said resistance element by current passing through the latter.

2. The thermostat assembly of claim 1, in which said mounting portion of said support is provided, adjacent said temperature-sensitive member, with a projection, said support having an aperture extending into said projection, said temperature-sensitive member being received over said projection, said conductive member extending into said aperture and insulated from said temperature-sensitive means by said projection, said resistance element being mounted on said conductive member and electrically connected thereto, said insulating means being interposed between said resistance element and said temperature-sensitive member adjacent said conductive member, said conductive member securing said resistance element and said temperature-sensitive member to said mounting portion of said support.

3. A thermostat assembly comprising an insulating support having a one-piece mounting portion with an arm extending out longitudinally therefrom, a first member mounted on said mounting portion at a first point, extending under said arm and carrying a first electrical contact, a temperature-sensitive member mounted on said mounting portion at a second point longitudinally spaced from said first point, extending out therefrom beneath and vertically spaced from said first member and carrying a second contact positioned opposite said first contact, said temperature-sensitive member being distortable so as to cause said second contact to move toward and away from said first contact in accordance with the temperature changes sensed by said temperature-sensitive member, a current-carrying flexible resistance element mounted on said mounting portion substantially at said second point and extending out therefrom in registration with and located in close juxtaposition to said temperature-sensitive member so as to be in substantial thermal transfer relation thereto, electrical terminal means mounted on an external exposed surface of said support at a third point spaced from said second point, a conductive member passing through said support between said second and third points and electrically connected at one end to said terminal means, said resistance element being electrically connected at one end to said second contact and at its other end to said conductive member, and means electrically insulating said temperature-sensitive member from said conductive member, whereby said temperature-sensitive member, substantially except for said second contact carried thereby, is out of the electrical circuit to said second contact but is sensitive to the heat developed in said resistance element by current passing through the latter.

4. The thermostat assembly of claim 3, in which said mounting portion of said support is provided, adjacent said temperature-sensitive member, with a projection, said support having an aperture extending into said projection, said temperature-sensitive member being received over said projection, said conductive member extending into said aperture and insulated from said temperature-sensitive means by said projection, said resistance element being mounted on said conductive member and electrically connected thereto, said insulating member being interposed between said resistance element and said temperature-sensitive member adjacent said conductive member, said conductive member securing said resistance element and said temperature-sensitive member to said mounting portion of said support.

References Cited by the Examiner
UNITED STATES PATENTS

| | | | |
|---|---|---|---|
| 2,623,137 | 12/52 | Vogelsberg | 200—122 |
| 2,785,251 | 3/57 | Cassidy | 200—138 |
| 2,817,741 | 12/57 | Turner | 200—122 |
| 3,078,360 | 2/63 | Ulanet | 200—138 Y |

BERNARD A. GILHEANY, *Primary Examiner.*